Feb. 13, 1923.

E. C. YOUNG

DIRIGIBLE SPOTLIGHT

Filed Aug. 1, 1921

1,444,896

Inventor
Edward C. Young,
By
Attorneys

Patented Feb. 13, 1923.

1,444,896

UNITED STATES PATENT OFFICE.

EDWARD C. YOUNG, OF DETROIT, MICHIGAN.

DIRIGIBLE SPOTLIGHT.

Application filed August 1, 1921. Serial No. 488,765.

*To all whom it may concern:*

Be it known that I, EDWARD C. YOUNG, a citizen of the United States of America, residing at Detroit, in the county of Wayne and State of Michigan, who have invented certain new and useful Improvements in Dirigible Spotlights, of which the following is a specification, reference being had therein to the accompanying drawings.

This invention relates to a dirigible spot light especially designed for a closed body of an automobile or single vehicle, the spot light being located outside of the body and adapted to be manipulated or adjusted from within the body, so that a ray of light may be cast in a desired direction.

The primary object of my invention is to provide a dirigible lamp that may be swung in horizontal and vertical planes, and novel means is employed for supporting the lamp relative to an automobile body or other support so that the lamp may be swung.

Another object of this invention is to provide a dirigible spotlight embodying an oscillatory hollow arm, a trunnion lamp at the outer end of said arm, and connections through said arm to said lamp so that said lamp may be adjusted relative to said arm. Included in the connections is a member carried by the inner end of the arm to facilitate oscillation of said arm and while said arm is being adjusted the lamp at the outer end thereof may be shifted.

Figure 1:
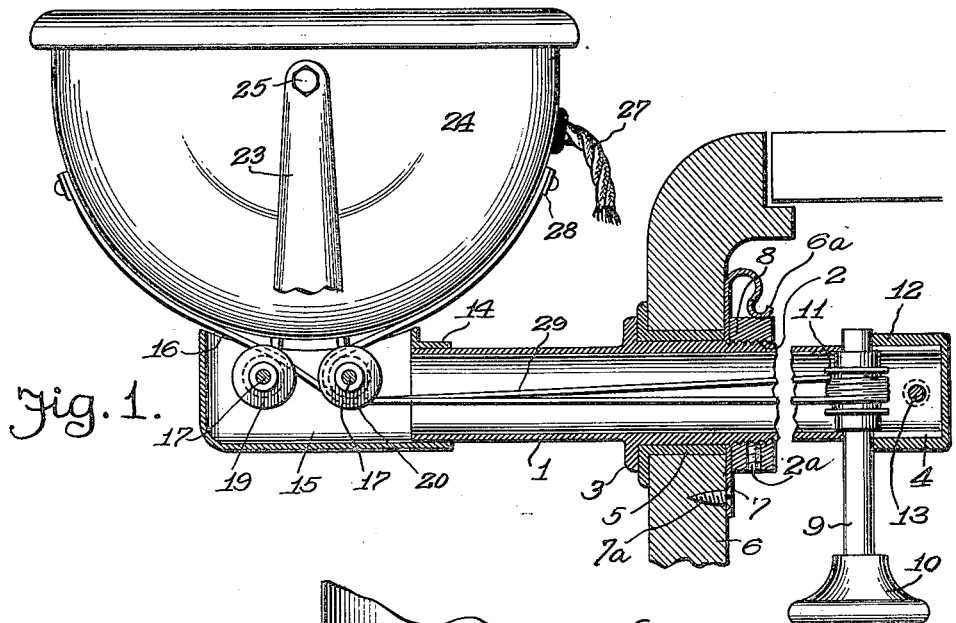

A further object of this invention is to provide supporting and adjusting means for a spotlight, headlight, search light or lamp wherein the parts are constructed with a view of reducing the cost of manufacture and at the same time retain those features by which durability and ease of operation are secured. With such ends in view my invention resides in the construction to be hereinafter described and then claimed, and reference will now be had to the drawing, wherein Figure 1 is a plan of the spotlight, partly broken away, and partly in horizontal section, showing the same as supported by a portion of an automobile body.

Figure 2:
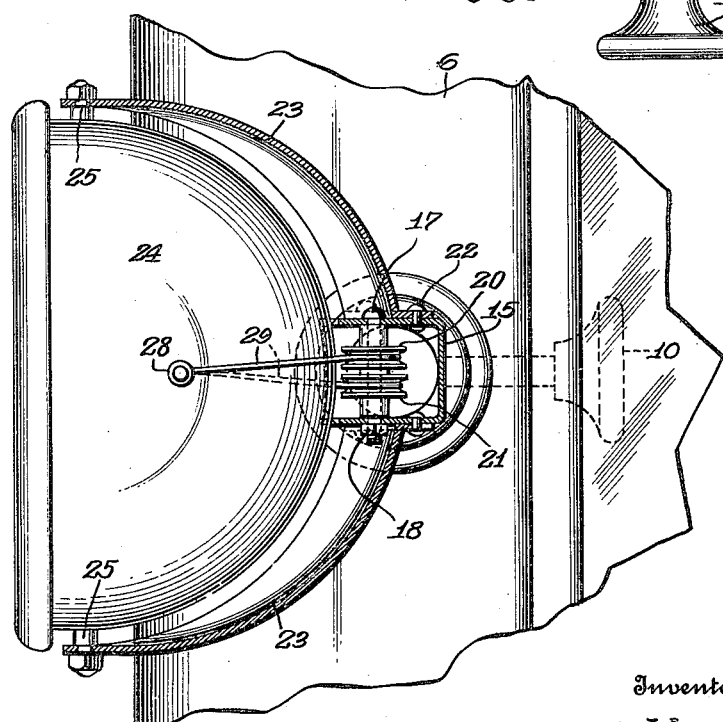
Figure 3:
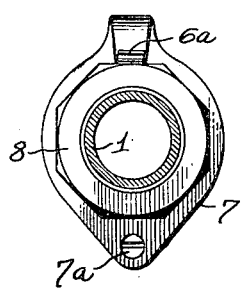

Fig. 2 is a side elevation of the spotlight, partly broken away and partly in vertical section, and Fig. 3 is an elevation of a locking device for the spot light.

In the drawing, the reference numeral 1 denotes a hollow or tubular arm which has the inner end thereof screwthreaded, as at 2, provided with a collar 3, and slotted, as at 4. The screw threads 2 are in spaced relation to the collar 3, and the intervening space of said tubular arm is adapted to be journaled in a flanged bushing 5 mounted in a support 6, said support being illustrated as a portion of a closed automobile body. The collar 3 of the hollow arm 1 abuts the flange of the bushing 5 and associated with said bushing is a washer 7 engaged by a nut 8 fixed on the screw threads 2 by a screw 2$^a$, said nut holding the hollow arm 1 so that it may be oscillated in the bushing 5. The washer 7 is fixed by a screw 7$^a$ and said washer has a resilient detent 6$^a$ adapted to engage facets of the nut 8 and hold the hollow arm 1 in set or adjusted positions.

The slots 4 are in opposed relation in the extreme inner end of the hollow arm and detachably mounted in said slots is a transversely disposed rotatable shaft 9 having its outer end provided with a knob or handle 10 and said shaft is radially disposed relative to the hollow arm and serves as a crank or handle for oscillating said arm. On the shaft 9 within the slotted end of the arm is a spool 11 and said shaft is retained at the inner ends of the slots 4 by a cap 12 fitted on the inner end of the arm 1 and retained thereon by a transverse bolt 13 or other fastening means. The detachable cap 12 permits of easy access being had to the spool 11 and permits of the shaft 9 being easily assembled relative to the hollow arm.

Suitable mounted on the outer end of the hollow arm 1 is a sleeve portion 14 of a housing 15 having a concave open face 16. Vertically disposed within the housing 15 are bolts 17 held in place by nuts 18 and rotatable on said bolts are sheaves 19, 20 and 21, the sheave 19 being on one of the bolts and the sheaves 20 and 21 on the other bolt with the sheave 21 in the same horizontal plane as the sheave 19 and all of said sheaves at the open face 16 of the housing 15.

Riveted or otherwise connected, as at 22, to the upper and lower walls of the housing 15 are the inner ends of the arms 23, said arms being curved and cooperating with the housing 15 in providing a yoke in which is trunnioned, to swing in a horizontal plane, a lamp casing or reflector 24, said lamp casing having its upper and lower walls provided with trunnions or pintles 25 held in the outer ends of the arms 23. The lamp casing 24 is of a conventional form containing an incandescent lamp and the side of said casing has leading-in wires or a conductor 27 so that the incandescent lamp may be placed in circuit with a suitable source of electrical energy.

Attached to the side walls of the lamp casing 24 are the ends 28 of a flexible member 29 that may be in the form of a cable, chain or cord. The flexible member extends into the housing 15 and the hollow arm 1 with one end portion of the flexible member engaging the sheaves 19 and 21 and the other end portion of the flexible member trained about the sheave 20. The flexible member is frictionally wound about the spool 11 of the shaft 9 so that said member may be wound on and unwound from said shaft when rotated. Clockwise rotation of the shaft 9, considering Fig. 1, causes the lamp casing 24 to be swung to the left and counterclockwise rotation of the shaft 9 causes the lamp casing to be swung to the right. During either of these adjustments the shaft 9 may be bodily swung in an arc to oscillate the hollow arm 1.

From the foregoing it will be observed that the hardware entering into my lamp support and adjusting mechanism is exceedingly simple in construction and may be readily finished to harmonize with other metallic fixtures or an automobile body, so that the spotlight will present a neat appearance.

It is thought that the operation and utility of the spotlight will be apparent without further description, and while in the drawing there is illustrated a preferred embodiment of my invention, it is to be understood that the structural elements are susceptible to such changes as fall within the scope of the appended claims.

What I claim is:—

1. A dirigible spot light for automobiles comprising an oscillatory hollow arm having an inner slotted end, a yoke fixed to the outer end of said arm, a lamp trunnioned in said yoke, a flexible member having its ends attached to said lamp at diametrically opposed points in a plane at a right angle to the plane of the lamp trunnions for swinging said lamp in a horizontal plane in said yoke, said flexible member extending into said hollow arm, a rotatable shaft mounted in the slotted inner end of said arm, a spool mounted on said shaft and about which said flexible member is trained, and a cap fixed on said arm retaining said shaft in the slotted end of said arm, said shaft facilitating oscillatory movement of said arm to swing said lamp in a vertical plane.

2. In a dirigible spot light, a support, a hollow arm journaled in said support, a nut retaining said arm in said support, a washer between said support and nut and connected to said support, a resilient detent carried by said washer and engaging a facet on said nut to hold said arm in an adjusted position, an adjustable lamp at the outer end of said arm, a flexible member in said arm attached to said lamp and adapted to adjust said lamp, a shaft protruding from said arm at a right angle thereto and about which said flexible member is trained in said arm and adapted to be shifted when said shaft is rotated, and a cap on the end of said arm retaining said shaft in engagement with said arm.

In testimony whereof I affix my signature in presence of two witnesses.

EDWARD C. YOUNG.

Witnesses:
ANNA M. DORR,
KARL H. BUTLER.